Aug. 9, 1949.    O. WITTEL    2,478,442
ORTHOPSEUDO RANGE FINDER
Filed Feb. 9, 1946    2 Sheets-Sheet 1
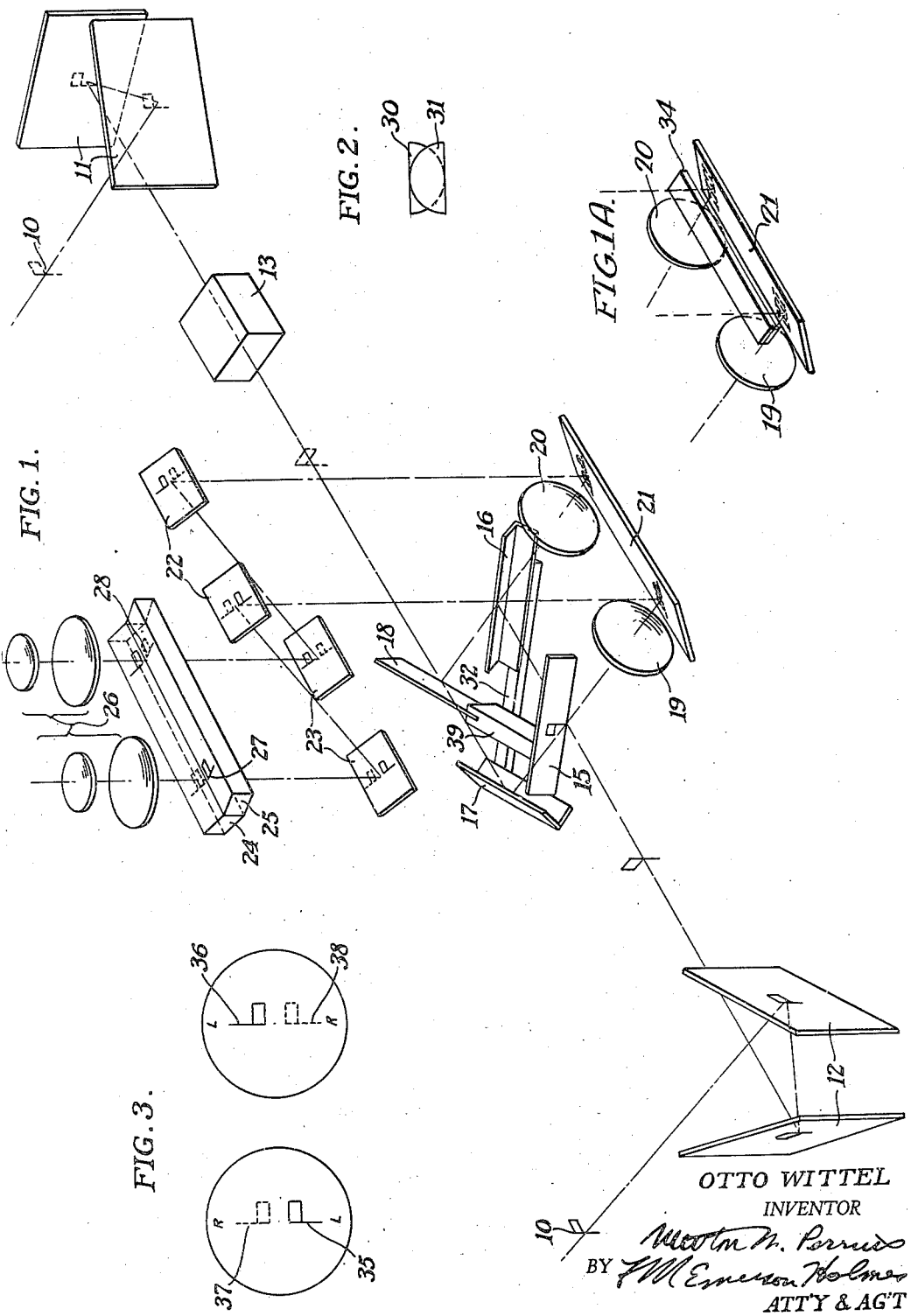
OTTO WITTEL
INVENTOR
BY
ATT'Y & AG'T Aug. 9, 1949.  O. WITTEL  2,478,442
ORTHOPSEUDO RANGE FINDER
Filed Feb. 9, 1946  2 Sheets-Sheet 2
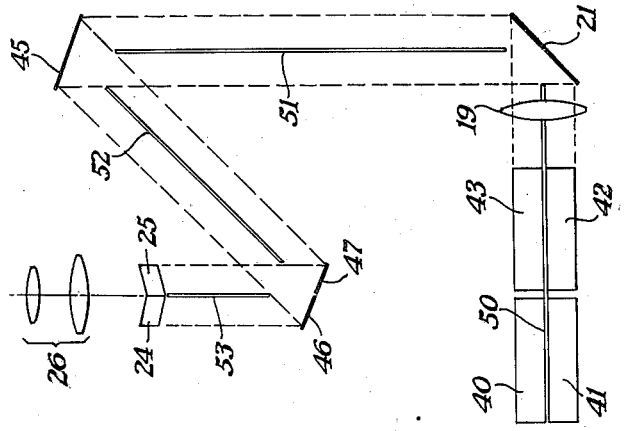
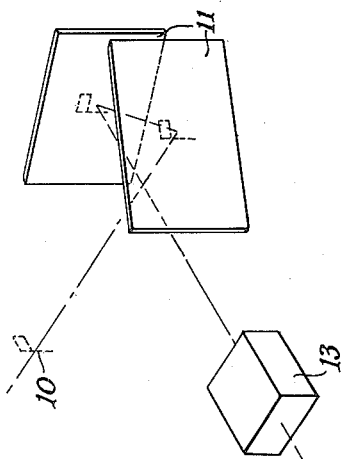
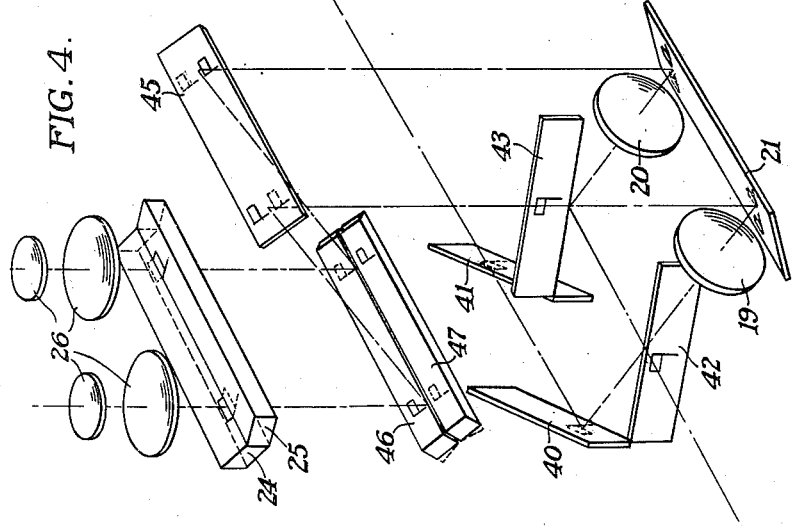
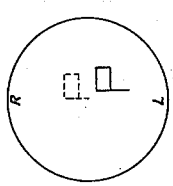
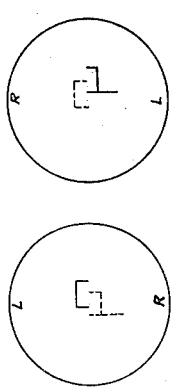
FIG. 4.
FIG. 6.
FIG. 5A.
FIG. 5B.
OTTO WITTEL
INVENTOR
BY
ATT'Y & AG'T Patented Aug. 9, 1949

2,478,442

UNITED STATES PATENT OFFICE 2,478,442

ORTHOPSEUDO RANGE FINDER

Otto Wittel, Rochester, N. Y., assignor to Eastman Kodak Company, Rochester, N. Y., a corporation of New Jersey Application February 9, 1946, Serial No. 646,682

2 Claims. (Cl. 88—2.6)

This invention relates to ortho-pseudo stereoscopic range finders.

Ortho-pseudo stereo range finders are a cross between coincidence type range finders and stereoscopic range finders. Coincidence is judged in depth; this is an operation which can be performed with great accuracy by most observers. The theoretical acuity of ortho-pseudo instruments is double that of ordinary stereo instruments. The elimination of reticles avoids systematic error often introduced by the observer's reaction and also any errors due to symmetrical temperature changes in the optical bar are minimized.

It is the primary object of the present invention to provide a simple construction which can be made free from distortion caused by temperature gradients or mechanical strains and which automatically eliminates the sources of such errors. With the elimination of errors in instrument adjustment by the present invention it is possible to avoid the need for auto-collimating or collimation adjustment such as by the various systems described in the series of applications listed in Serial No. 472,831, filed January 19, 1943, by Mihalyi, now U. S. Patent 2,401,700.

It is a secondary object of the invention to provide an instrument with a minimum number of optical parts and with a maximum amount of light transmission. The simplicity of construction according to the present invention and the fact that there are no parts which must be positioned accurately reduces manufacturing problems to a minimum.

According to the present invention the light is received in the usual way at horizontally spaced viewing points and the right and left viewing point beams are directed toward each other, but are offset slightly either by having one of the viewing point penta reflectors slightly ahead of the other or by having one of them deflect the light through an angle slightly greater than 90° and the other deflect the light through an angle slightly less than 90°. The terms "horizontal, vertical, front, back, upper and lower" are all used throughout this specification and claims relative to one another and do not necessarily represent any absolute orientation in space. The two beams travelling more or less toward each other are then picked up by a relatively simple beam-splitter-beam-combiner consisting of a pair of reflector units in each beam, one unit optically behind the other. The upper half of one beam is reflected to one side into alignment with the lower half of the other beam and vice versa. The beams thus combined when viewed binocularly are such that the left eye sees the upper half of one viewing point beam and the lower half of the other viewing point beam and the right eye sees the other portions of the beams. Once the beams are thus combined they may be passed through any number of optical units whose adjustment is not critical since whatever happens to the lower half of one beam simultaneously happens to the upper half of the other beam so that the eye viewing these two halves sees no effective change in the apparent range. If, however, one viewing point beam is tilted relative to the other, a shift in apparent range results. Therefore it is necessary that the reflector units in the upper halves of each beam be rigidly attached to one another and similarly the reflector units in the lower halves must be rigidly attached to one another. Relative movement between the upper and lower halves of the system do not introduce any appreciable error.

Preferably each combined beam (made up of the upper half of one viewing point beam and the lower half of the other viewing point beam) is brought to focus by an objective forming juxtaposed images. If the reflector units in either the lower or upper halves of each beam are roof reflectors, one of the images is inverted relative to the other and the well-known invert orthopseudo stereo field of view results. Since the two beams or more exactly the two halves of each of the combined beams travel juxtaposed, the resultant images are not easily viewable simultaneously; the eyepiece position becomes quite critical and one cannot simultaneously see all of both images with uniform intensity. This difficulty may be overcome by light deviating means positioned in the image plane to tilt one of the beams relative to the other and thus to overlap the exit pupils of the system. Any number of mirrors may be included between the beam splitter-combiner unit and the eyepieces, since no error is introduced thereby and especially since high magnification requires long focal length lenses to be used which results in a long optical path. This long optical path can be folded to form a compact unit by introducing such additional mirrors.

Ranging may be accomplished by any of the well-known light deviating means placed in one of the viewing point beams but I prefer to use the equi-crescent ranging mechanism described in my copending application Serial No. 646,683, filed concurrently herewith and now Patent 2,476,013, located in the converging beams optically following the objectives.

On instruments according to the invention it has been noted that the image formation by one-half only of the objective has no visible deleterious effect. Penta reflectors built according to the invention described in Serial No. 590,826 Arnold and Norton filed April 28, 1945 and now Patent 2,430,551, have proven to be amply precise for viewing points so that no appreciable error is introduced at this source.

Other objects and advantages of the invention will be apparent from the following description of the preferred embodiments thereof when read in connection with the accompanying drawings in which:

Fig. 1 is a perspective view of the optical system of a range finder incorporating a preferred embodiment of the invention.

Fig. 1A shows an alternative arrangement of one detail of the system shown in Fig. 1.

Fig. 2 represents the overlapping of the exit pupils of the optical system shown in Fig. 1.

Fig. 3 shows the binocular field of view as seen in Fig. 1.

Fig. 4 is a perspective view of an optical system of a slightly different embodiment of the invention.

Figs. 5A and 5B show the alternative fields of view for different adjustments of the system shown in Fig. 4.

Fig. 6 is a side view of the central assembly of Fig. 4.

In Fig. 1 light from a distant object represented by small flags 10 arrives at right and left viewing points 11 and 12 whereat it is reflected by pentareflectors to form two beams going toward each other slightly offset. The left viewing point flag is shown in solid lines and the right viewing point flag is shown in broken lines to distinguish the beams as they travel through the optical system but both flags represent the same distant object. The left viewing point beam is split in two portions by reflector units 15 and 16. The upper half of the beam is reflected to one side by the mirror 15; the lower half is reflected parallel thereto by the roof mirror 16. Similarly the right viewing point beam after passing through suitable light deviating means 13 is split, its upper half being reflected by the mirror 18 into alignment with the lower half of the left viewing point beam and its lower half being reflected by the roof mirror 17 into alignment with the upper half of the left viewing point beam. These juxtaposed beams are focused by objectives 19 and 20 to form images 27 and 28 in the focal planes of left and right eyepieces 26. Both beams are reflected by mirrors 21, 22, and 23 in order to make the instrument more compact while using long focal length lenses 19 and 20 for the sake of increased magnification. Optical wedges 24 and 25 intercepting both beams at the focal plane tilt the upper halves relative to the lower halves so that the exit pupils corresponding to each half are overlapped as shown at 30 and 31 in Fig. 2.

The upper half of the left viewing point beam forms image 35 in the left eyepiece and the lower half forms inverted image 36 in the right eyepiece. Similarly the upper half of the right viewing point beam forms image 38 and the lower half forms image 37 as shown in Fig. 3. Deviation of one of the viewing point beams relative to the other will cause images 37 and 38, for example, to move to the left. Thus image 38 moves closer to image 35 and image 37 moves further from image 36. The stereoscopically viewed image of the lower half thus appears to move toward the observer and similarly the stereo image in the upper half appears to move away from the observer. The adjustment is continued until the two images appear at the same distance and the range is read in accordance with the adjustment of the light deviating means 13.

Any error which causes both lower images 35 and 38 to move equal distances to the right or left would not cause any change in the apparent distance of the stereo image in the lower half and hence would not affect the ranging adjustment. It is only relative movements of the images 35 and 38 or relative movements of images 36 and 37 which cause range errors. Therefore stability is insured by rigidly attaching the mirror 15 to the mirror 18 by bar 39 and similarly attaching the roof mirrors 16 and 17 rigidly together by means 32 (indicated only schematically for the sake of clarity). Even though the beam splitter and combiner is of the simplest design, consisting of two mirrors or reflector units one behind the other to reflect the upper and lower halves of each beam, the instrument has a very high resulting stability. It is of interest to those designing range finders to note that the stability is believed to be greater than any other ortho-pseudo range finder and far greater than any other stereo range finder.

The light deviating means 13 may be of any of the standard types such as rotating wedges or may be replaced by the equi-crescent ranging mechanism located in the position indicated at 34 in Fig. 1A, which mechanism is described in detail in my copending application Serial No. 646,683, filed concurrently herewith.

Fig. 4 differs from Fig. 1 only in minor ways. The beam splitter-combiner is made up of four plane mirrors 40, 41, 42, and 43 so that the images are not inverted relative to one another. Mirror 45 replaces the two mirrors 22 of Fig. 1, but neither this mirror nor the mirror 21 needs to be a single unit since no errors are introduced by tilting one combined beam relative to the other combined beam. Two mirrors 46 and 47 replace the mirrors 23 to permit a halving adjustment as shown in Figs. 5A and 5B. With the reflectors 46 and 47 effectively in line the images appear as shown in Fig. 5A but separation of the images as shown in Fig. 5B can be obtained by tilting the reflector 46 relative to the reflector 47.

In the embodiment shown, the left viewing point penta reflector 12 is located behind the right viewing point penta reflector 11. However, these may be placed in line provided the reflector 11 deviates its beam through only 89° say and the reflector 12 deviates its beam through 91° so that the beams are offset as they reach the center. In this connection the mirrors 40 and 41 may be tilted slightly if the combined beams are to travel parallel to the incoming beams, but in any case the mirror 41 is still at right angles to the mirror 42 and the mirror 40 is still at right angles to the mirror 43.

In each of the embodiments of the invention baffles are usually included to prevent light from either half of the objectives from reaching the wrong half of the field. Such baffles are not shown in Fig. 1 and Fig. 4 since they would confuse the drawing, but they are shown (edge-on view) at 50, 51, 52 and 53 in Fig. 6. They extend all the way from the beam splitter combiner to the image plane, except where they would interfere with the beams being reflected by mirrors 21, 45, 46, and 47. When the mirrors 46 and 47 are coplanar, the baffle 53 receives the light which would otherwise cause complete (overlapping) images instead of juxtaposed image parts as shown in Fig. 5A.

Interpupillary adjustment is accomplished simply by moving the eyepieces and the objectives together. This results in lengthening the base of one-half of the field, but the base of the other half being shortened compensates for this error. In addition to the overlap of the exit pupils gained by the tilted wedges 24 and 25 these wedges reduce the dividing line to a fairly sharp one which increases the ease of ranging.

Having thus described the preferred embodiments of my invention, I wish to point out that it is not limited to these structures but is of the scope of the appended claims.

I claim and desire to secure by Letters Patent of the United States:

1. An ortho pseudo stereo range finder comprising double reflection reflector means at horizontally spaced viewing points for receiving right and left viewing point beams from the target being ranged and for directing them toward each other slightly offset so that one beam passes behind the other, a beam splitter-combiner unit centrally located to receive both beams, to split each into two portions and to combine each portion with one of the portions of the other beam, said beam splitter-combiner consisting of four reflector units respectively in the upper and lower halves of each beam, and means entirely within and part of said beam splitter combiner unit rigidly attaching the reflector units in the upper halves together at right angles to each other and rigidly attaching the reflector units in the lower halves together at right angles to each other light deviating means in at least one of the beams for producing relative displacement of the right and left viewing point beams and means for viewing the upper half of one beam and the lower half of the other with the left eye and the lower half of said one beam and the upper half of said other with the right eye simultaneously to give ortho-pseudo stereo vision.

2. An ortho-pseudo stereo range finder according to claim 1 in which one pair of rigidly connected reflector units is made up of plane mirrors and the other pair is made up of roof mirrors whereby the lower halves of each beam are inverted relative to the upper halves and in which the upper and lower edges of the beams are juxtaposed forming combined beams parallel to one another, and in which an objective is included in each of the combined beams for forming right and left viewing point images of the target one above the other, baffles are included in each of the combined beams for separating the two halves thereof, light deviating means are located at the image for tilting the upper and lower halves toward each other to overlap the exit pupils of the optical system and eyepieces are included for stereoscopically viewing the images formed by the objectives.

OTTO WITTEL.

REFERENCES CITED

The following references are of record in the file of this patent:

UNITED STATES PATENTS

| Number | Name | Date |
| --- | --- | --- |
| 1,013,849 | Taylor | Jan. 2, 1912 |
| 1,148,222 | Eppenstein | July 27, 1915 |
| 2,098,767 | Thomas | Nov. 9, 1937 |
| 2,172,098 | Eppenstein | Sept. 5, 1939 |

FOREIGN PATENTS

| Number | Country | Date |
| --- | --- | --- |
| 21,887 | Great Britain | 1903 |
| 15,200 | Great Britain | 1907 |